June 21, 1966   H. W. LE FEVRE   3,257,043
AEROSOL VALVE WITH METERING BUTTON
Filed Feb. 4, 1964   2 Sheets-Sheet 1

INVENTOR
Herbert W. LeFevre

BY Stevens, Davis, Miller & Mosher
ATTORNEYS

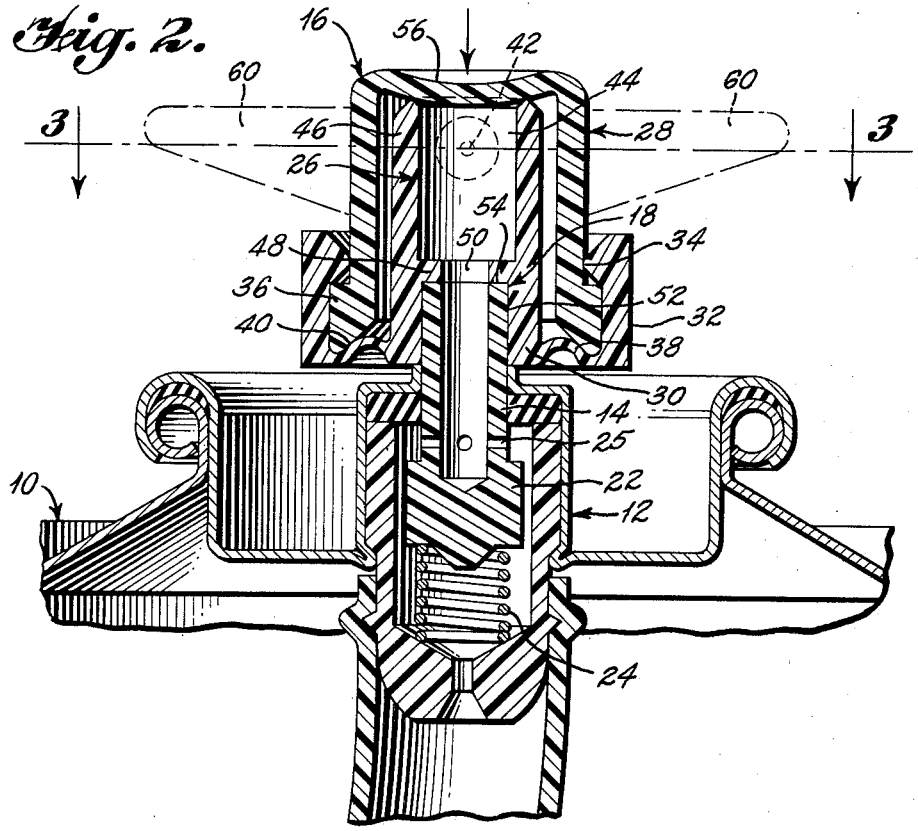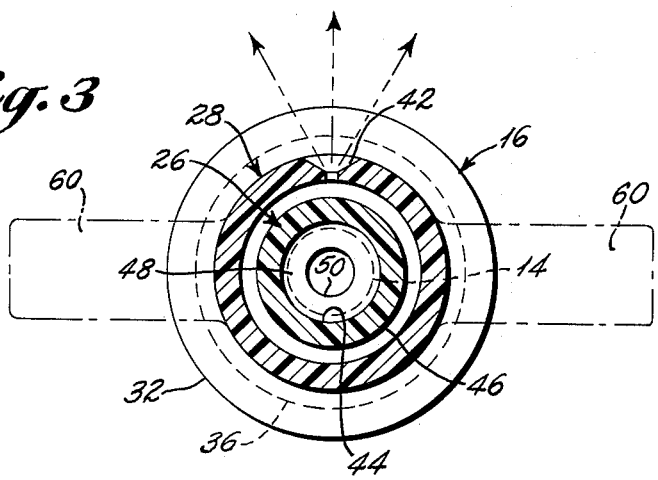

United States Patent Office 3,257,043
Patented June 21, 1966

3,257,043
AEROSOL VALVE WITH METERING BUTTON
Herbert William Le Fevre, 1201 Glenbrook Terrace,
Oklahoma City, Okla.
Filed Feb. 4, 1964, Ser. No. 342,422
8 Claims. (Cl. 222—394)

This invention relates to dispensers of the pressurized type, commonly known as aerosol dispensers. More particularly, the invention relates to a dispenser of this general description which provides a simple and efficient means for dispensing a predetermined, or metered, quantity of material.

The specific type of device under consideration herein involves the conventional type of aerosol can, equipped with the usual type of valve which permits a continuous quantity of material to be dispensed while it is held in open position but, combined therewith, a new and novel type of metering valve actuator which functions to limit the amount of material that is emitted by the device upon a single opening of the valve. Repeated actuation of the valve permits dispensing of uniform quantities of material as determined by the capacity of the structure of the valve actuating unit, thus avoiding the undesirable condition which prevails in continuous types of dispensers in dispensing an unnecessary quantity. Devices of the general type are known in the art, and, while they can be constructed to function satisfactorily, they present a problem of assembly and cost of manufacture because of the relatively large number of parts which must be carefully and precisely assembled. The present invention has as its principal object the provision of a dispensing device, more particularly a metering assembly for association with the valve stem of the usual aerosol dispenser which can be produced economically, which is reliable and durable in its operation while at the same time having a minimum of parts, and which may be quickly and easily assembled together for association with the container. According to this invention the metering assembly actually utilizes only two parts, which however function actually as one unitary part. Moreover, utilization of suitable molding techniques will permit production of the metering unit of the invention as an intial one piece construction.

Additionally, the metering and valve actuating assembly of this invention is adapted to be employed as a continuous type of dispenser alternatively. In other words, the invention contemplates a metering dispenser which alternatively may be employed to discharge continuously. This is accomplished by the manner of construction of the metering unit as a dual functioning assembly, that is, the functions being both to meter and to actuate the dispensing valve to which it is attached.

A more complete description of the invention follows hereinafter in conjunction with the appended drawings wherein:

FIGURE 2 is a fragmentary vertical cross section similar to FIGURE 1, but with the metering cap depressed to open the valve and fill the metering chamber; and FIGURE 3 is a horizontal section through the metering cap; taken along line 3—3 of FIGURE 2.

Figure 1:
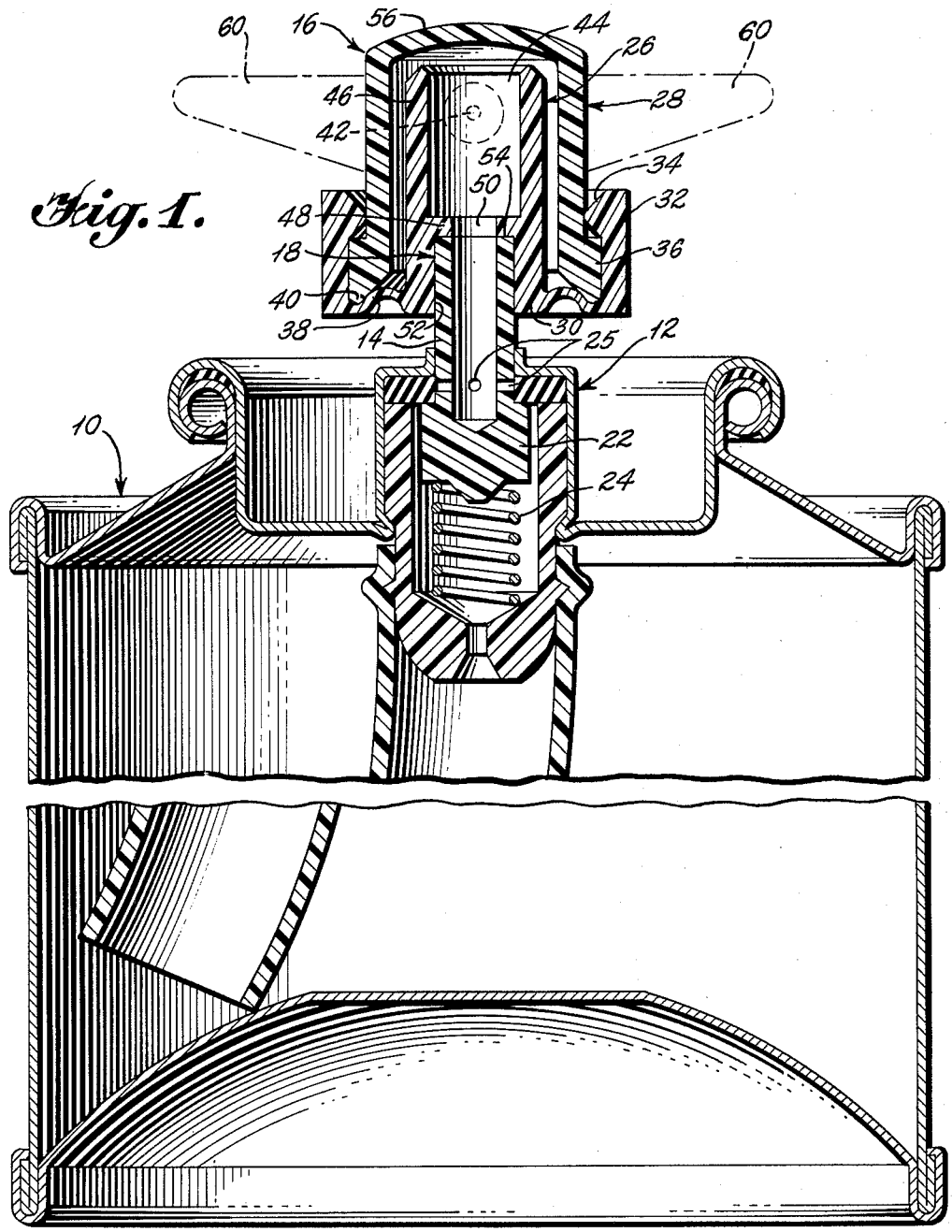
FIGURE 1 is a vertical cross section through a typical pressurized spray dispenser can showing the metering cap of the present invention.

Referring to FIGURE 1 of the drawings numeral 10 denotes an aerosol can which may be employed to dispense any desired fluid material. The can is provided with a valve assembly denoted generally by numeral 12 having an upstanding valve stem 14. The metering unit or button provided according to this invention is denoted by numeral 16 and, as may be seen in FIGURES 1 and 2, it is seated atop the valve stem 14 as indicated generally at numeral 18.

The valve assembly 12 is of a well known type which, when assembled together with the can top 20 upon the can, effectively seals the container. The valve stem 14 is provided with a closure element 22 which is normally urged to the closed position as shown in FIGURE 1 by spring 24. Depression of the valve stem 14 against the spring pressure moves the closure element downwardly to its open position, as seen in FIGURE 2, thereby opening the valve and permitting the contents of the can to flow upwardly into and out of the valve stem by way of ports 25. When the valve stem is no longer being held open, it normally and quickly returns to its closed position; however in a dispenser of the continuous type, so long as the valve is held open, material contained in the can continues to flow.

Referring more particularly to the metering unit provided according to this invention, two parts are involved which determine the quantity of material permitted to be dispensed by a single depression of the valve stem 14. Numeral 26 denotes an inner chamber element and numeral 28 denotes an outer enclosure element therefor, these two element when assembled forming the metering and valve actuating assembly of the invention.

Referring more particularly to element 26 and the portion thereof which serves to lock it together with element 28, depending outwardly from the bottom wall portion 30 and having attached thereto, or formed therewith, is an unstanding annular wall 32. Wall 32, adjacent its upper end and on the interior thereof, is provided with an inwardly extending annular lip 34.

Outer cover element 28 is a cup-like structure having its open end enlarged at the rim thereof to provide an outwardly depending flange denoted by numeral 36. As will be seen from the drawings, in assembled relationship the outer closure cup 28 is associated in locking engagement with the inner chamber element 26, flange 36 thereon taking a position beneath lip 34 and bearing against the upstanding wall 32. It will be observed that bottom wall 30 is shown as a curved surface providing an inner ramp 38. Also the enlarged rim of the closure element 28 is sloped inwardly of the cup to provide a relatively narrow cricular surface 40. The narrow sloping surface thus seats itself upon ramp 38 and is thereby held securely against outer wall 32.

The elements 26 and 28 are preferably formed of a plastic material having sufficent flexibility to permit their assembly with slight flexure, polyethylene being an example of a suitable material. Obviously, however, the elements may be formed of other materials affording the qualities necessary for functioning according to the teachings of the invention.

Referring again to outer closure member 28, it will be observed that a dispensing opening is provided in the side wall thereof, as indicated at numeral 42.

As will be seen in the drawings, outer closure element 28 surrounds the innermost structure of the element 26 and, as shown in FIGURE 2, when its upper surface is depressed inwardly, it forms a closed chamber 44, now to be described in greater particularity.

Chamber 44 is provided by an annular wall 46 which extends upwardly from the bottom wall 30. Extending inwardly from the inner walls of the chamber is a bottom wall 48 having an opening 50 therein leading to a hollow valve stem socket 52. As will be seen, socket 52 is shaped to fit tightly about the valve stem and it seats thereon in sealing relationship against the bottommost surface of chamber 44 as at numeral 18, and more particularly as denoted by numeral 54.

As indicated hereinabove, the upper wall, of closure element 28, as denoted by numeral 56 is flexible in that it is deformable in a direction generally axially of the chamber 44. As may be seen in FIGURE 2 of the drawings, the upper wall has been flexed inwardly in the direction of chamber 44, and its inside surface of the wall 56 is in direct contact with the upper edge of the chamber. In this position, chamber 44 is completely sealed at its top and remains so as long as the wall 56 is held in the position of FIGURE 2. Upon releasing the pressure on wall 56, it returns to its position as shown in FIGURE 1.

As has been indicated above, the valve actuation assembly of this invention is associated with an aerosol dispenser by seating the assembly upon the valve stem 14 of the can. The junction between the valve stem and the actuator assembly is such as to form a tight seal and to retain the material released from the can within the actuator assembly until such time as it is desired to release it to the atmosphere.

In operation, a completely assembled aerosol dispenser having the actuator assembly of this invention mounted on its valve stem and containing a suitable material to be dispensed, pressure is exerted downwardly on the upper surface of the wall 56, whereupon it is flexed to the position of FIGURE 2 of the drawings. Simultaneously, and by continued exertion of downward pressure, the valve stem is forced downwardly against the spring 24 to a point where ports 25 are uncovered and allow material from the can to flow into the valve stem and thence into chamber. Chamber 44 fills rapidly under the pressure of the can and equilibrium conditions are reached between the chamber 44 and the can substantially immediately. Removal of the holding pressure on wall 56, and the valve opening pressure, allows spring 24 to close the main valve of the aerosol can and at the same time upper wall 56 returns to its normal position as shown in FIGURE 1. The contents of the chamber then flow outwardly beneath wall 56 to the sole opening 42 where it is dispensed in the usual manner. Since the main valve of the dispenser is closed, only the material contained in chamber 44 is emitted.

Thus, it will be seen that the device of this invention permits dispensing of metered quantities of any given material. It will be understood that the size of the chamber 44 may be varied to allow dispensing of incremental quantities of whatever volume desired.

It will be appreciated from the discussion herein that the present invention provides not only a substantially unitary metering unit requiring at most two separate parts, but it also adapts itself to association with dispensing units of the type heretofore supplied and in present production in large scale quantity without modification thereof whatsoever. The present invention in no way requires to be directly associated with the can structure or its valve. Thus, the invention provides an interchangeable type of dispenser actuator wherein if only a constant stream of fluid is desired, the ordinary type of dispensing nozzle may be applied to the unit, whereas if a metered quantity is desired, such may be readily accomplished by replacing the constant type nozzle with the metering type produced according to this invention, moreover, the present invention provides a metering unit which permits alternate continuous or metered dispensing as will be seen below. These are highly important advantages especially from the standpoint of manufacturers of dispensing units since its permits continuance of production of aerosol type dispensers without modification of existing equipment and without effecting changes in valve construction which have undergone extensive testing and development to a point of eminent commercial satisfaction.

Another important advantage mentioned immediately above which flows from the construction disclosed herein is that when the metering assembly of the invention is associated with an aerosol dispenser by way of its valve stem as taught herein, the unit may be employed to actuate the valve stem without closing the upper end of the chamber therein by grasping the unit about its side walls and exerting downward pressure sufficient to open the dispenser valve. If desired, suitable finger pressure surfaces may be formed as a part of the unit whereby to easily exert the valve opening downward force, the pressure points extending outwardly from the side walls of the unit, preferably approximately 90° from the discharge port and on either side thereof. Thus, the invention contemplates also a combination type of dispenser unit permitting both continuous and metered or incremental dispensing. The finger placement points are showing in the drawings in broken lines in FIGURE 1, and are denoted by numeral 60.

It is desired to point out that while the invention has been discussed as involving an assembly composed of two parts, actually, it will be appreciated that elements 26 and 28 may in the final assembly be sealed together so as to form a single part or unit including the functioning structure therewithin. Obviously, the invention is not to be restricted by an particular means or method by which the unit is provided wherein the metering chamber and its closing means are included. For example, but not in a limiting sense, the unit may be completely cast in its entirety except for the flexible surface 56 which may later be supplied and attached in any suitable manner. In this instance, the main body of the structure may be of a hard plastic or metal, the top surface being of a flexible material firmly affixed to the said main body.

Thus, the invention contemplates a substantially unitary preformed metering unit for association with the valve of an ordinary dispensing container, the unit having a port therein for receiving material from the dispenser (upon the opening of its valve) into a chamber in the said unit, which chamber is closed at its discharge end upon movement of a portion of the unit into closing relationship therewith by the exertion of pressure thereon, the said pressure substantially at the same time being transmitted by the unit itself to the said valve to effect its opening, thus permitting flow of material from the container into the closed chamber; and, thereafter, upon release of the said pressure, the said chamber-closing portion of the unit moving from its position of closure, either under its own inherent properties, or under pressure exerted by the material in the chamber itself, thereby permitting the material in said chamber to flow therefrom to a point of discharge formed for the specific purpose in the said unit; and additionally such a unit which may alternately be employed to dispense continuously by application of pressure to the unit at a point or points remote from the chamber-closing portion thereof.

The valve actuator and metering assembly of this invention may be formed of any suitable material as has been indicated above. Plastic materials are preferred because of their ease of molding and convenience in assembly of the respective molded parts. Polyethylene, for example, is an entirely suitable material as it may be formed with rigidity sufficient to prevent complete collapse but with sufficient flexibility, particularly at the upper surface area 56, to permit its easy flexure to the chamber closing position. If desired, the structure providing the inner chamber element 26 with its surrounding outer bottom surface 30 and wall surface 32 may be formed of a somewhat more rigid material than the outer closure element 28, thereby assuring that the inner chamber and the appended structure will not collapse under the pressure which is necessary to effect closure of the chamber and actuation of the valve spring.

What is claimed is:

1. A metering assembly especially adapted for cooperation with a dispenser of the aerosol type whereby to dispense incremental quantities of material contained therein, said dispenser having a valve normally effecting its sealing, and a valve stem extending outwardly therefrom, whereby the said valve is actuated, said valve stem providing a fluid passageway from the interior of said dispenser to the atmosphere; said assembly comprising means thereon for affixing said assembly upon said valve stem, a port in said assembly in communication with the interior of said valve stem, said port leading to a chamber in said assembly, said chamber having an outlet opening therein; a cup-like element positioned invertedly around said chamber and affixed thereabout in sealing relationship therewith, the end closure wall of said cup-like element lying adjacent the outlet opening of said chamber and being of flexible material whereby manual pressure on said wall effects its movement into sealing relationship with the opening of said chamber, said wall flexing oppositely and returning to a non-closing position upon the release of said pressure; a discharge port in said cup-like element providing fluid communication between the atmosphere and the opening of said chamber.

2. A metering assembly especially adapted for cooperation with a dispenser of the aerosol type whereby to dispense incremental quantities of material contained therein, said dispenser having a valve normally effecting its sealing, and a valve stem extending outwardly therefrom, whereby the said valve is actuated, said valve stem providing a fluid passageway from the interior of said dispenser to the atmosphere; said assembly being comprised of two parts, one of said parts having a valve stem socket, said socket having an inlet opening communicating with said passageway, a chamber in communication with said passageway, said chamber having an outlet opening, and means on said chamber for receiving in fixed relationship a chamber sealing unit, the other of said parts being said chamber sealing unit and including a flexible wall portion lying adjacent said outlet opening of said chamber, said flexible portion constituting means for closing and opening said outlet opening upon flexure thereof; said chamber sealing unit having a discharge port leading to the atmosphere, said discharge port being in fluid communication with the interior of said chamber through said outlet opening when said chamber closing portion is in non-flexed position.

3. A metering assembly especially adapted for cooperation with a dispenser of the aerosol type whereby to dispense incremental quantities of material contained therein, said dispenser having a valve normally effecting its sealing, and a valve stem extending outwardly therefrom, whereby the said valve is actuated, said valve stem providing a fluid passageway from the interior of said dispenser to the atmosphere; said assembly comprising a first element having a bottom wall and an outer upstanding annular wall extending from said bottom, and an annular lip on the inner surface of said upstanding wall, a valve stem socket located centrally in said bottom wall and extending upwardly therefrom, a passageway leading from said socket to an enlarged annular chamber thereabove, said chamber terminating at its upper end in an annular ridge defining an outlet opening leading from said chamber; a second element comprising an inverted cup-like structure fitting downwardly and surrounding said chamber, an annular flange on the rim of said cup-like structure extending outwardly therefrom, said cup-like structure having its closed end flexible axially of said assembly, said first and second units assembled to form a unitary structure, said flange underlying said lip and effecting sealing relationship therewith, the closed end of said cup overlying the upper annular ridge of said chamber and normally assuming a position slightly thereabove when in unflexed position, said cup-like structure being of greater internal diameter than the outer diameter of said chamber thereby providing a cylindrical volume about said chamber, said volume constituting a fluid passageway, and a discharge port in said cup-like structure in communication with said last mentioned passageway.

4. A metering assembly as claimed in claim 3 in combination with an aerosol type dispenser having a normally closed valve and a hollow valve stem extending upwardly therefrom, said valve normally being closed by a spring pressure having an upward thrust and being normally opened by downward pressure on said stem, said metering assembly being positioned on said valve stem by way of said socket.

5. A metering assembly as claimed in claim 1 wherein means is provided extending outwardly from the sides thereof constituting finger placement points facilitating the application of pressure upon said assembly, which points are remote from the chamber closing portion thereof, whereby said assembly may be employed alternately as a continuous dispenser or a metering dispenser.

6. A metering assembly as claimed in claim 2 wherein means is provided extending outwardly from the sides thereof constituting finger placement points facilitating the application of pressure upon said assembly, which points are remote from the chamber closing portion thereof, whereby said assembly may be employed alternately as a continuous dispenser or a metering dispenser.

7. A metering assembly as claimed in claim 3 wherein means is provided extending outwardly from the sides thereof constituting finger placement points facilitating the application of pressure upon said assembly, which points are remote from the chamber closing portion thereof, whereby said assembly may be employed alternately as a continuous dispenser or a metering dispenser.

8. A metering assembly as claimed in claim 4 wherein means is provided extending outwardly from the sides thereof constituting finger placement points facilitating the application of pressure upon said assembly, which points are remote from the chamber closing portion thereof, whereby said assembly may be employed alternately as a continuous dispenser or a metering dispenser.

References Cited by the Examiner

UNITED STATES PATENTS

| | | | |
|---|---|---|---|
| 1,194,450 | 8/1916 | Wesel | 222—514 X |
| 2,662,668 | 12/1953 | Schmidt | 222—579 X |
| 2,722,224 | 11/1955 | Blann. | |
| 2,892,576 | 6/1959 | Ward. | |
| 2,913,749 | 11/1959 | Ayres. | |
| 3,138,301 | 6/1964 | Ward. | |

RAPHAEL M. LUPO, *Primary Examiner.*